Oct. 14, 1924.

S. VERNET

GEAR

Filed Dec. 6, 1923

INVENTOR
Sergius Vernet
BY
William P. Hammond
ATTORNEYS

Oct. 4, 1924.
S. VERNET
GEAR
Filed Dec. 6, 1923
1,511,309
2 Sheets-Sheet 2
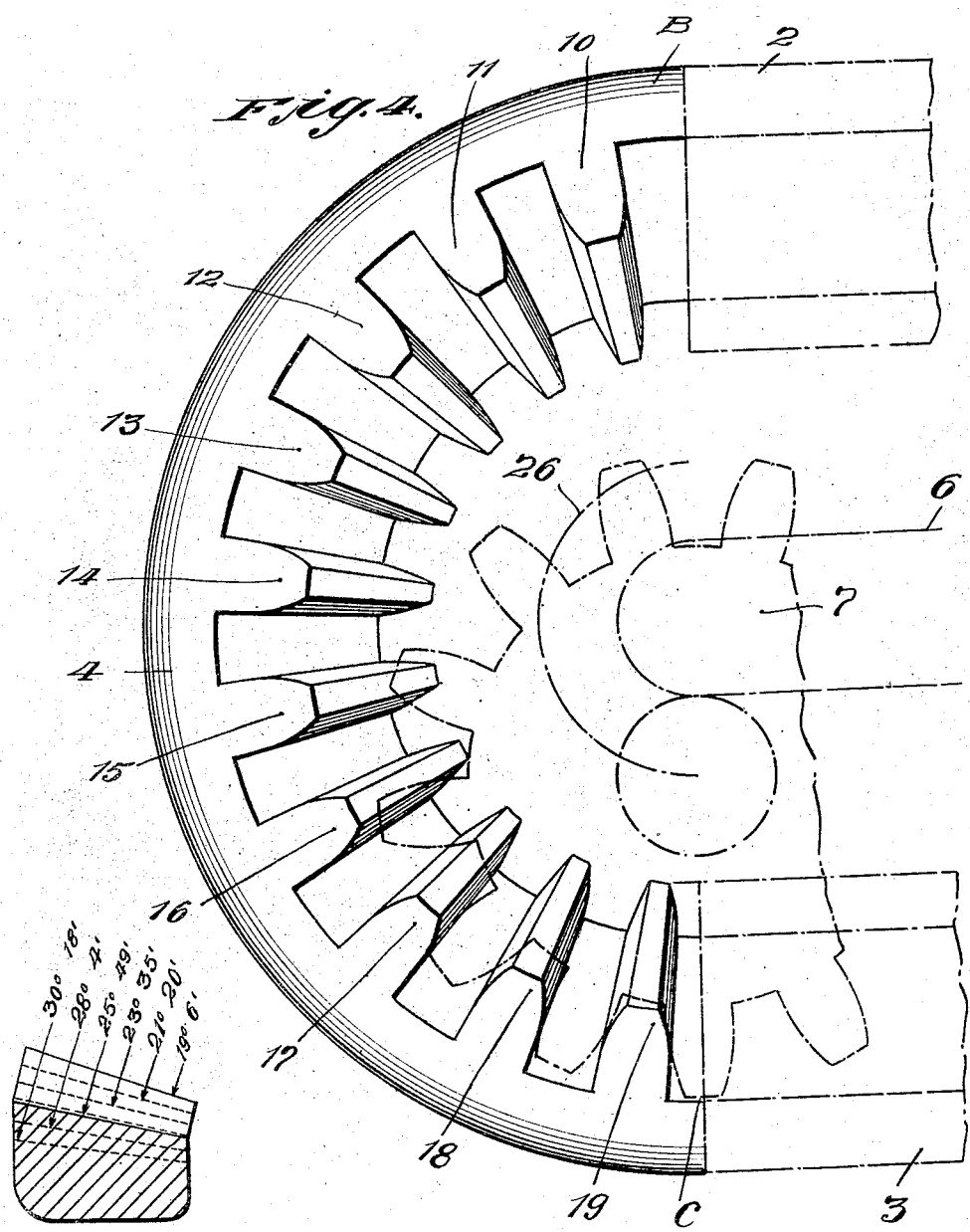

Patented Oct. 14, 1924.

1,511,309

UNITED STATES PATENT OFFICE.

SERGIUS VERNET, OF NEW YORK, N. Y.

GEAR.

Application filed December 6, 1923. Serial No. 678,805.

*To all whom it may concern:*

Be it known that I, SERGIUS VERNET, a citizen of the United States, residing in New York city, in the county and State of New York, have invented certain new and useful Improvements in Gears, of which the following is a specification.

This invention relates to a new construction for gears, and more especially to a new type of warped gear, which will operate smoothly and accurately in all positions of its movement.

It is an object of the invention to provide a gear of the type described wherein the shape and design of the teeth in the warped portion varies so that the teeth in the warped portion mesh accurately with the teeth on the pinion in all positions of the gear.

In prior gears of this type it has not been customary to vary the shape or pitch of the teeth in the warped portion from the shape or pitch of the teeth in the straight portion, and consequently while these gears will operate in large and powerful machinery because of the excess power and the play tolerated between the teeth of a large pinion and large gear, it has been found that gears of this prior type are not suitable for delicate machine parts operating on a small power because the teeth in the warped portion of the gear due to the shifting of the relative position of the gear and pinion do not mesh accurately with the teeth on the pinion and the gear clogs the operation of the machine.

It is a feature of my invention that gears of the type described will operate smoothly in the reversing mechanism of very delicate machine parts operating on a small power without clogging the machine or without breaking any of the parts thereof.

Various other objects and advantages will appear as the description proceeds.

Referring now to the drawings which illustrate one form of embodiment of the invention:

Fig. 4, is a development on an enlarged scale of the warped portion of the gear.

Fig. 5 is a diagrammatic view illustrating the difference in the cone angle of the teeth in the warped portion of the gear.

Figure 1:
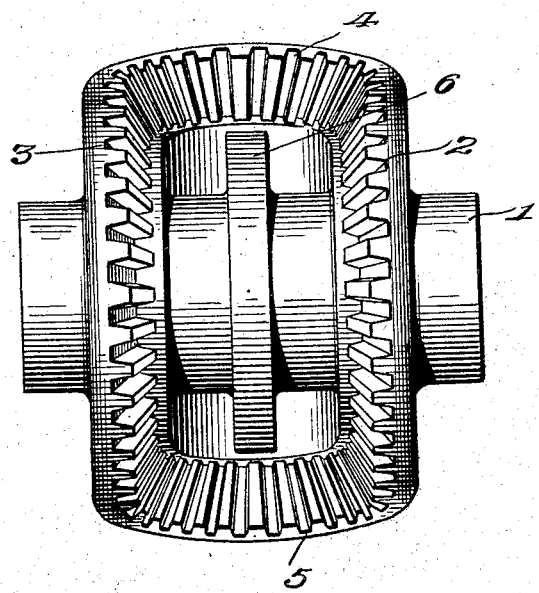
Fig. 1 is a face view of the gear I have invented.
Figure 2:
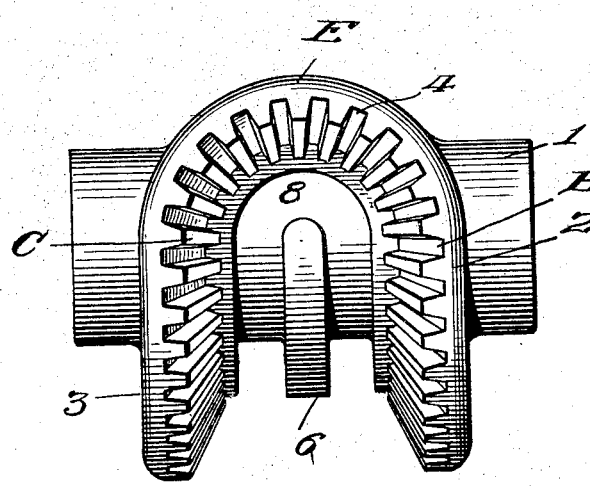
Fig. 2 is a view looking from the top of Fig. 1.
Figure 3:
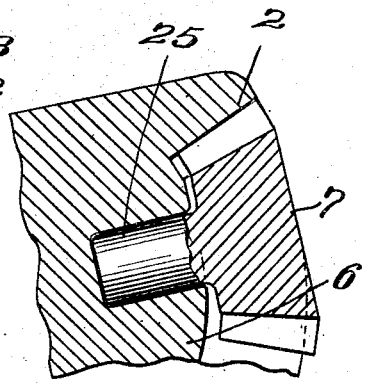
Fig. 3 is a sectional view of the gear and its driving pinion.

In the form of embodiment illustrated the gear is carried by a hub portion 1 which may be bored to receive an axle or shaft and is preferably of non-circular shape or provided with a key so that it turns with the shaft but has relative longitudinal movement thereon. The gear comprises a pair of ordinary external bevel gear sectors 2 and 3, connected at their ends by the warped portions 4 and 5. A guide 6 between the sectors 2 and 3 guides the gear along the projection 25 of the pinion 7 so that the sector 2 of the gear on the right side of the guide 6 travels along the rotating pinion which meshes with the gear to drive the same, the warped portion 4 travels around the pinion and slides the gear longitudinally on its shaft to move the projection 25 through the opening 8 whereupon the continued rotation of the pinion causes the sector 3 on the left side of the guide to travel back along the pinion and the warped portion 5 to go around the pinion to again slide the gear longitudinally on its shaft and bring the pinion in mesh with the sector 2 thus alternately sliding the gear back and forth on its shaft and oscillating the shaft back and forth.

In a movement of this kind, it is important that the teeth of the pinion mesh accurately with the teeth of the gear in both the sectors 2 and 3, and the warped portions 4 and 5, and I have found that in order to have the gear operate smoothly, it is necessary due to the shifting of the relative position of the gear and pinion to have the shape of the teeth in the warped portion vary progressively from the end of one beveled gear sector 2, to the mid-point of the warped portion and then back to the shape of the teeth in the sector 3.

In carrying out this feature of the invention, the shape of the teeth varies progressively from the external bevel gear teeth of the sectors 2 and 3 to approximately a rack tooth at the center of the warped portion and then goes progressively back to a bevel ed gear tooth of the shape of the teeth in sectors 2 and 3.

In the specific embodiment illustrated all the teeth in the sectors 2 and 3 and the in warped portions 4 and 5 are cut on the same circular pitch angle. The teeth in the sectors 2 and 3 are cut with equal cone angles and the teeth in the warped portions 4 and 5 are cut on a cone angle which increases progressively from the end B of the sector 2 to the mid-point E of the warped portion and then decreases progresively to the point C of the sector 3.

To take a specific example, when the teeth of the warped portions have a constant circular pitch angle of 17° 30', and the teeth of the sectors 2 and 3 have a cone angle of 19° 6', (i. e. the angle between the plane of the teeth in the sectors 2 and 3 and the axis of the pinion 7 is 19° 6',) due to the constantly changing positions of the pinion relative to the gear, as the axis of the pinion travels the path 26 between the sectors 2 and 3, the first tooth 10 of the warped portion in order to mesh accurately with the pinion will have a cone angle of 21° 23', the second tooth 11 will have a cone angle of 24° 7', the tooth 12 will have a cone angle of 26° 21', tooth 13 will have a cone angle of 28° 36', and the center tooth 14 will have a cone angle of 30° 18'. From the center the cone angle of the teeth 15, 16, 17, 18 and 19, will decrease progressively to the same value as the cone angle of the sector teeth which is 19° 6'. In gears where the warped portion carries a whole number of teeth between the ends of the sectors 2 and 3, the increase in the cone angle on each side of the center will be equal; however in the present instance, the warped portion contains 10¼ teeth and the tooth 14 is, therefore, not in the exact center so that the teeth 15, 16, 17, 18 and 19 do not have the same cone angle as the teeth 14, 13, 12, 11 and 10 but have cone angles of 28° 4', 25° 49', 23° 35', 21° 20' and 19° 6', respectively.

Fig. 4 illustrates diagrammatically the increase in the cone angle of the gear teeth from the end of the sector 3 to the mid-point of the warped portion 4. Starting with a cone angle of 19° 6' in the sector 3 the cone angle of the next tooth 19 in Fig. 4 is increased to 21° 20', tooth 18 has a cone angle of 23° 35', tooth 17 has a cone angle of 25° 49', the angle of the following tooth is 28° 4', and that of the center tooth 30° 18', from which tooth the cone angle progressively decreases to the value of 19° 6' in the sector 2.

The term "circular pitch angle" is used in the specification to denote the angle which one tooth makes with the adjacent tooth, and is measured by extending a line through the centers of the teeth to the center of the circle about which the end portions are warped and measuring the angle formed at the intersection of these lines.

The circular pitch angle is the same for all teeth cut on the same circle, i. e. the circular pitch angle for all the teeth in the curved portions 2 and 3 is the same, and for all the teeth in the warped portions 4 and 5 is the same.

It is to be understood of course, that the specific angles are by way of example only, and may vary in minutes and seconds from the figures given, and that they apply only to the gear illustrated, but that the principles of the invention embrace the design of warped gears of the type illustrated having teeth of ununiform shape and pitch in the warped portions, or to a warped gear having teeth of a uniform circular angle, and having the cone angle of the teeth increase progressively from the ends of the straight sectors to the center of the warped portion and then decrease progressively to the cone angle of the straight sectors.

As the terms are used in this specification a rack tooth is distinguished from a bevel gear tooth, first, in the difference in the shape of a correctly designed rack and bevel gear tooth and second in the fact that planes passed thru the centers of the teeth of a bevel gear will meet in a common point whereas the planes passed thru the centers of the teeth of a rack do not meet in a common point.

It is obvious that various modifications can be made in the specific shape and pitch of the teeth of the gears without departing from the spirit of the invention or the scope of the appended claims.

What I claim is:

1. In a gear of the type described, the combination of curved portions having teeth of a uniform shape, and warped portions having teeth of ununiform shape.

2. In a bevel gear of the type described, the combination of curved portions having teeth of a uniform cone angle, and warped portions having teeth of ununiform cone angle.

3. In a bevel gear of the type described, the combination of curved portions having teeth of uniform shape and cone angle and warped portions having teeth of ununiform shape and cone angle.

4. In a gear of the type described, the combination of curved portions, having teeth of bevel gear shape and warped portions in which the shape of the teeth varies progressively from a bevel gear shape to substantially a rack tooth at the center of the warped portion and then goes back to a bevel gear shape at the end of the warped portion.

5. A gear of the type described having curved and warped portions, the teeth in the curved portions having a uniform cone angle and the teeth in the warped portions having an ununiform cone angle.

6. A gear of the type described having connected curved and warped portions, the teeth in the curved portions having a uniform cone angle and the teeth in the warped portion having a progressive increase in cone angle from each end of the curved portions to the mid-point of the warped portions.

7. A gear of the type described having connected curved and warped portions, the teeth in the curved portions having a uniform cone angle of approximately 19° 6′, and the teeth in the warped portions having ununiform cone angles, which progressively increase from the end of one curved portion to approximately the midpoint of the warped portion, and then progressively decrease to the cone angle of the other curved portion substantially as follows—tooth one 21° 23′, tooth two 24° 7′, tooth three 26° 21′, tooth four 28° 36′, tooth five 30° 18′, tooth six 28° 4′, tooth seven 25° 49′, tooth eight 23° 35′, tooth nine 21° 20′, tooth ten approximately 19° 6′.

In testimony whereof I have affixed my signature to this specification.

SERGIUS VERNET.